ABSTRACT OF THE DISCLOSURE

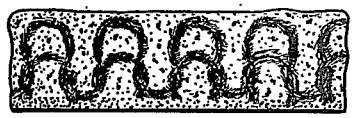
FIG.1 — Hydrophilic Fibre / Polyuretane Elastomer
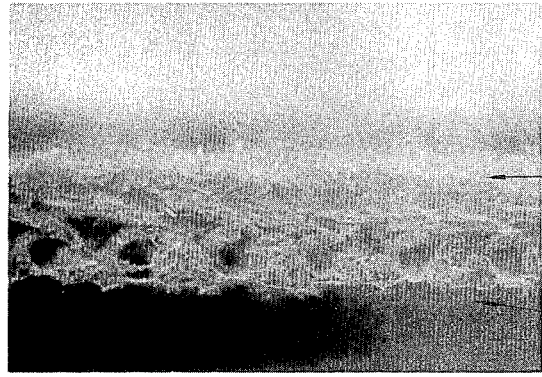
FIG.2 Microscope photograph.
Front
Rear
FIG.3 a Front
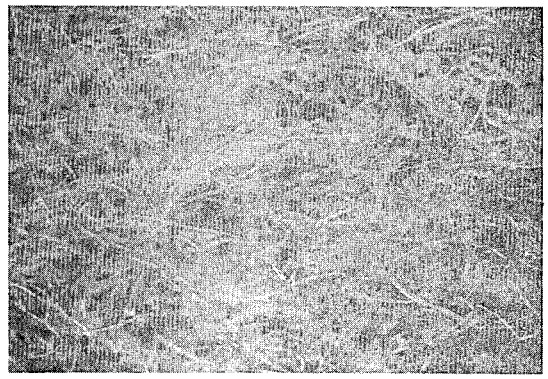
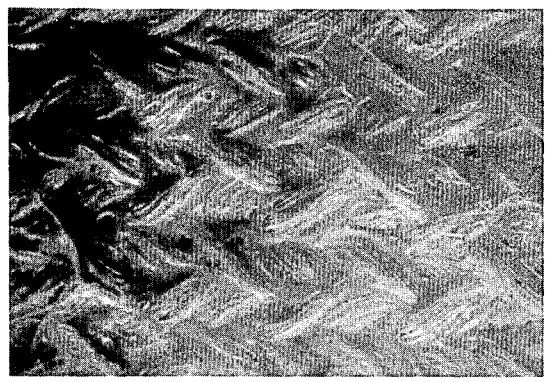
FIG.3 b Rear 3,690,911
PROCESS FOR PREPARING SYNTHETIC
SUEDE SHEETS
Hiroshi Endo, Tokyo, Kazuo Tokoyoda, Funabashi, and Takemi Fujiyu, Yasuaki Kayasuga, and Tokio Kunii, Tokyo, Japan, assignors to Suehiro Sen-I Kogyo Kabushiki Kaisha, Tokyo, Japan
Filed Apr. 22, 1970, Ser. No. 30,760
Claims priority, application Japan, June 30, 1969, 44/51,373
Int. Cl. B29j 1/04; D06n 3/14
U.S. Cl. 117—17                                   6 Claims

A thin, flexible, soft and tough synthetic suede sheet comprising a homogeneous unitary structure of a napped knitted fabric containing at least 50% of hydrophilic fibers and 30 to 50% by weight of a microporous polyurethane resin impregnated in the knitted fabric is prepared by treating the napped knitted fabric with a low concentration resin solution in a solvent soluble in water, adjusting the resin content in the fabric to 30 to 50% by weight, passing the fabric through a bath of cold water to remove the solvent and cause the resin to coagulate thus forming said composite structure, drying the composite structure at a temperature of 138° C. to 162° C. to set the resin and polishing the dried composite structure.

BACKGROUND OF THE INVENTION

This invention relates to a new and improved synthetic suede sheet and a process for preparing the same.

In recent years, the art has made remarkable advances in the process of preparing various types of synthetic leathers. Synthetic leathers utilized to manufacture shoes and the like are required to have sufficient porosity or permeability to air or moisture comparable to that of natural leathers. Also they are required to have sufficient physical strength.

A number of proposals have been made in the past. According to one proposal a solution of resin is prepared by dissolving a mixture of high molecular polymers of polyurethane resins and other thermoplastic resins in a solvent soluble in water, and an organic solvent soluble in water but incapable of dissolving the resins is incorporated into the resin solution to disperse microparticles of the resins to form a gel. The gel is then coated upon the surface of a base fabric and the treated fabric is treated with a water bath to cause the non-solvent to diffuse in the water to coagulate and deposit the resins on the surface of the fibers of the fabric to form a layer of microporous polyurethane elastomer. This method is called the wet method. Methods of bonding a layer of microporous polyurethane elastomer and a base fabric and methods of laminating them are also reported in many papers.

The present inventors have also proposed a process of preparing synthetic suede sheets comprising the steps of selecting a napped knitted fabric of double rib stitch or modified double rib stitch structure made of spun yarns consisting essentially of hydrophilic fibers, immersing the napped fabric in a dilute solution of a polyurethane elastomer having a molecular weight ranging from 50,000 to 70,000 and a hardness of less than 82, at room temperature, removing the excess resin liquid from the immersed fabric, passing this fabric under the absence of tension for a short time through a first coagulation liquid consisting of water maintained at a temperature ranging from 5° C. to 15° C., thus causing coagulation of the elastomer, then passing the fabric under transverse tension for a short time through a second coagulation liquid of the same temperature as the first coagulation liquid to stretch the knitted fabric in the transverse direction and to complete coagulation of the polymer as well as setting of weft width, dehydrating the napped fabric thus treated, and finishing the dried fabric by polishing by means of a roller wrapped with a sandpaper or a sanding roller. This process is disclosed in copending United States patent application Ser. No. 686,416 filed on Nov. 29, 1967, now U.S. Pat. 3,532,529.

SUMMARY OF THE INVENTION

It is an object of this invention to provide a synthetic suede sheet having high permeability to air and moisture, and a velvet-like surface construction, which is also soft and yet durable.

Another object of this invention is to provide a synthetic suede sheet having good appearance, tough feeling, flexibility draping property and other excellent physical properties, and which is easy to sew to prepare clothes, shoes, gloves, bags and the like.

A still further object of this invention is to provide a new and improved artificial suede sheet not yet known in the art.

Briefly stated the novel synthetic suede sheet embodying this invention comprises a homogeneous and integral composite structure consisting of a napped knitted fabric containing from 50 to 100% of hydrophilic fibers and a microporous polyurethane resin, deposited on the fiber, the quantity of the polyurethane resin being from 30 to 50%, based on the weight of the fabric. The thickness of the suede sheet preferably ranges from 0.5 to 1.0 mm. The sheet has high permeability to air and moisture and a velvet-like surface construction and is soft and flexible.

The base fabric utilized in this invention comprises a napped warp knitted fabric or a napped weft knitted fabric containing from 50 to 100% of a hydrophilic fiber. The term "hydrophilic fibers" used herein means hydrophilic fibers such as cotton, viscose rayon (including polynosic), viscose staple, cupra, etc.

The base knitted fabric may optionally contain less than 50% of other artificial fibers such as polyester, nylon, acrylic fiber, polypropylene fiber which can be knitted or spun together with the hydrophilic fiber for the purpose of reinforcing the same. The base fabric is knitted by utilizing filaments or fine yarns. The knitted fabric is a warp knitted fabric such as tricot or raschel for example or weft knitted fabric such as a plain stitch or a double rib stitch structure. One surface of the base fabric is napped.

The length of the napped fibers range from 0.8 to 1.5 mm.

Generally, it is desirable that the knitted fabrics have small, dense loops so that the fabrics may have smooth surfaces of little irregularities and small thickness. Where a warp knitted fabric is selected, one surface thereof may be implanted with short fibers which are secured thereto by the conventional electrostatic coating technique to provide a napped surface.

The quantity of the polyurethane resin utilized in this invention amounts to 30 to 50%, by weight, based on the weight of the base fabric.

The polyurethane resin utilized may be commercially available thermoplastic polyurethane resins such as a straight chain prepolymer prepared from 4,4'-diphenylmethane diisocyanate (MDI) and polyol (high molecular weight compound containing active hydrogen) or a straight chain prepolymer prepared from tolylene diisocyanate (TDI) (a mixture consisting of 80% of 2,4-tolylene diisocyanate and 20% of 2,6 - tolylene diisocyanate) or a blended polymer of MDI and TDI. If desired, less than 30% of polyvinyl chloride or acrylic polymer may be admixed with the polyurethane resin. To accomplish the objects of this invention, it is desirable that the polyurethane resin has a molecular weight of 50,000 to 70,000.

As the solvent for polyurethane resin a water-compatible solvent is used including, for example N,N - dimethylformaldehyde (DMF), N,N - dimethylacetoamide (DMA), N,N - diethylformamide (DEF), dimethylsulfoxide (DMSO), dioxane (DEDO), tetrahydrofurane (THF) and mixtures thereof.

As described, according to this invention, a warp or weft knitted fabric containing at least 50% of hydrophilic fibers and having one surface napped is selected as the base fabric of the novel suede. The present inventors have now succeeded in finding a process and conditions of resin treatment suitable for this base fabric. More particularly, in accordance with this invention, the above-described straight chain high molecular weight polymer consisting essentially of polyurethane resin and having a molecular weight of 50,000 to 70,000 is dissolved in a solvent soluble in water to obtain a clear resin solution of low concentration (at most 10%, by weight). This solution is impregnated into the base fabric at a temperature of 20° C. to 30° C. and the solvent is removed from the treated fabric by means of squeeze rolls such that 30 to 50%, by weight, based on the weight of the base fabric, of the resins are deposited thereon. The squeezed fabric is then passed through a bath of cold water (coagulation bath) maintained at a constant temperature ranging from 5° C. to 15° C. to cause the solvent to dissolve and diffuse in the water, while at the same time causing the resins to uniformly deposit on the surface of the individual fibers and to impregnate and fill the interstices between fibers, thus forming a unitary composite structure of the microporous polyurethane resin and the layer of fiber.

The fabric treated with the resins as above-described is then thoroughly washed with water, and after removal of water by means of a centrifugal separator the treated fabric is dried while applying a transverse tension. If desired, water may be removed by utilizing a solution of a softener at a temperature of 60° C. to 80° C. Finally the dried fabric is subjected to a heat set treatment by heating it to a temperature of 138–162° C. for approximately one minute, preferably by using a tenter, and then the napped surface is subjected to a polishing treatment utilizing a roller wrapped with sandpaper. The polishing is accomplished to an extent such that the thickness of the resin-treated fabric or suede is decreased by approximately 0.2 mm.

Thus, this invention utilizes well-known polyurethane resins, solvents and non-solvent (water) for a selected base fabric but provides a novel synthetic suede and improved process steps and conditions appropriate for the selected base fabric. The process can be readily carried out on a commercial scale.

Advantageously, the above-described coagulation treatment in a cold water bath may be carried out in two steps. In the first water bath the fabric is advanced under absence of tension, but a slight vertical vibration is applied to the fabric. The stay time is about 2 minutes and the temperature of the water is maintained at a temperature ranging from 5° C. to 15° C. In the second water bath maintained at the same temperature as that of the first water bath, the width of the fabric is increased by about 10% by means of a tenter. The stay time in the second bath is about two minutes which is sufficient to completely coagulate the resins.

The novel suede may be dyed by bank dyeing for the raw material filament or yarns, by dyeing the knitted fabric or by piece dyeing the produced suede. Alternatively, a desired pigment may be dispersed in the resin solution.

According to this invention, a homogeneous unitary composite structure can be readily obtained wherein a minimum of 30 to 50% of resin is impregnated into the micropores in individual fibers to strongly bond the same. Products of very small thickness, e.g. 0.5 to 1.0 mm. can be readily obtained, which are highly permeable to air and moisture, soft, tough and flexible and have excellent appearance, touch, feeling and other desirable physical properties as well as velvet-like surface structure. Thus the products of this invention are comparable to natural suedes and are suitable for manufacturing various clothes and articles, e.g. women's half-coats, men's home wears, gloves, bags, cleaning cloths for mirrors, lenses, eyeglasses and the like. The novel suedes can also be used for ornamental purposes such as wall papers.

BRIEF DESCRIPTION OF THE DRAWINGS

The invention will be better understood and its various objects and advantages will be more fully appreciated from the following descriptions of examples taken in conjunction with the accompanying drawings in which FIG. 1 is a schematic cross-sectional view of a product embodying this invention;

FIG. 2 is a micrograph showing a section of a novel suede and

FIG. 3 is a photograph showing a plan view of the novel suede.

DESCRIPTION OF THE PREFERRED EMBODIMENTS

EXAMPLE 1

Construction of the knitted fabric—tricot 28G

| | Denier | Percentage of admixture |
|---|---|---|
| Blank, polynosic (filament) | 75 | 72.5 |
| 6 nylon filament, weight 173.5 g./m.² | 50 | 27.5 |

Above-described tricot fabric was dyed green and one surface thereof was napped about 1.2 mm. The width of the fabric after napping was 105 cm. and the weight thereof was 165 g./m.². A polyurethane elastomer consisting of 4,4'-diphenylmethane diisocyanate (MDI) and having a molecular weight of about 50,000 was used and N,N-dimethyl formamide (DMF) was used as the solvent. After completely dissolving one part by weight of MDI in four parts by weight of DMF, the solution was diluted with five parts by weight of DMF to obtain a clear resin solution containing 10% by weight of the resin. A green pigment was dispersed in the diluted resin solution at a ratio of 5 g./liter. The napped fabric was then dipped for two minutes in the resin solution maintained at a temperature of 25° C. and was then slightly squeezed with squeeze rolls to leave approximately 4 parts, by weight, based on the weight of the basis fabric, of resin solution. The squeezed fabric was then transferred to the coagulation step. The temperature of the coagulation water in both the first and second baths was maintained at 10° C. ±2° C. As described hereinabove, the squeezed fabric remained in the first coagulation bath for two minutes. The fabric was transferred into the second coagulation bath in which the width of the fabric was increased from 105 cm. to 110 cm. by means of a tenter. The stay time was also two minutes during which coagulation of the resin was completed to fix the width. After thoroughly washing the fabric with water, water was removed by means of a centrifugal separator. The width of the fabric was fixed to 100 cm. in a drier equipped with a tenter, and dried on a hot bed of 100° C. In the final step the fabric was dried to set to have a finished width of 100 cm. at a temperature of 140° C. ±2° C. and a stay time of 40 seconds. The napped surface of the fabric was then polished with a roller wrapped with sandpaper. The product had a thickness of 0.78 mm., finished width of 98 cm. and a weight of 218.8 g./m.² The quantity of resin deposited was 32.6%, by weight, based on the weight of the basic fabric. The product was a thin sheet closely resembling natural suede.

EXAMPLE 2

Construction of the knitted fabric—double rib stitch structure 28G, 24 inches, diameter
Blank—100% cotton, 60s (cotton count)
Weight—182 g./m.²
Width—130 cm.

Above-described knitted fabric was dyed pale yellow and one surface thereof was napped about 1.5 mm. The polyurethane elastomer utilized was a 1:1 mixture of a polymer of 4,4'-diphenylmethane diisocyanate (MDI) and tolylene diisocyanate (TDI) (containing 80% of 2,4-TDI and 20% of 2,6-TDI). The average molecular weight of the polyurethane elastomer was about 60,000. Dimethyl-sulfoxide (DMSO) was selected as the solvent. One part by weight of resin was completely dissolved in five parts by weight of the solvent (DMSO) and then further diluted with four parts by weight of DMSO to obtain a clear resin solution containing 10% by weight of the resin. Further, a yellow pigment was diffused in the diluted resin solution at a ratio of 1 g./liter. The napped fabric was dipped in the resin solution for two minutes at a temperature of approximately 25° C. and then slightly squeezed by rolls to impregnate the resin solution into the fabric in an amount of about four times by weight of that of the basic fabric. Then the fabric was transferred to the coagulation step. The temperature of the water in both the first and second coagulation baths was maintained at a temperature of 10° C. ±2° C. Again, in the first bath, the fabric was advanced under absence of tension but was imparted with a slight vibration in the vertical direction. The stay time was two minutes. In the second coagulation bath the width of the fabric was increased from 110 cm. to 125 cm. by utilizing a tenter. The stay time in the second coagulation bath was selected at two minutes in order to complete coagulation and to fix the width. Then the fabric was thoroughly washed with water, dried in a drier equipped with a tenter to set the width to 120 cm. and dried at a temperature of 100° C. In the final step the fabric was heated to a temperature of 140° C. ±2° C. for approximately 40 seconds to set the resin and to fix the width to 120 cm. Finally the napped surface was polished by the process similar to that of Example 1.

The product had a thickness of 1.02 mm., finished width of 118 cm., and a weight of 243.5 g./m.² The product contained 38.5%, by weight, based on the weight of base fabric, of the resin. The product was thin, soft, flexible and suitable for use as clothes, and cleaning cloths for mirrors and eyeglasses.

The product closely resembled natural suede and as shown in FIGS. 2 and 3 of the accompanying drawing, the polyurethane resin was uniformly impregnated in the interstices between individual fibers and uniformly deposited on each fiber, thus forming a unitary composite structure.

The following table illustrates typical physical characteristics of the synthetic suede embodying this invention.

PHYSICAL CHARACTERISTICS

| | Warp | Weft |
|---|---|---|
| Dry tensile strength (kg./2.5 cm. x 10 cm.) | 31.4 | 12.0 |
| Dry tensile elongation (percent) | 86.0 | 273.0 |
| Tear strength (kg.)[1] | 2.6 | 1.2 |
| Softness degree [2] | 0.02 | 0.03 |
| Resistance to surface abrasion (number of times) [3] | $8.1 \times 10^2$ | |
| Thickness (mm.) | 0.76 | |
| Weight (g./m.²) | 215.5 | |
| Air permeability (cc./cm.²/sec.) | 4.7 | |
| Moisture permeability (percent) [4] | 13.5 | |

[1] The tear strength was measured by the Tongue method as provided in the JIS.
[2] The softness was measured by the Clark method as provided in the JIS.
[3] The resistance to surface abrasion was determined by a universal wear tester as provided in the JIS. The conditions of measurements were: surface pressure—¼ lb.; paper standard—U.S.A. No. 0; air pressure—0.281 kg./cm.².
[4] The moisture permeability as measured by the reference test method as provided in the method of testing artificial fiber fabrics of the JIS. The conditions of measurements were: The relative humidity at 40° C.—35%; time of standstill—24 hours; temperature of the water—40° C.; internal diameter of the cup—7 cm.; total capacity—500 ml.

REMARKS.—Physical characteristics tabulated above were measured according to the testing method of synthetic fiber fabrics and knitted goods as provided in the Japanese Industrial Standard (JIS).

What we claim is:

1. A process for preparing a synthetic suede sheet comprising (1) napping at least one surface of a warp or weft knitted fabric containing at least 50% hydrophilic fibers in a manner such that the length of the napped fibers is from 0.8 to 1.5 mm; (2) dipping the napped fabric in a resin solution maintained at 20 to 30° C. and containing up to 10% by weight of a polyurethane resin having a molecular weight of 50,000 to 70,000 in a solvent soluble in water, (3) squeezing the dipped fabric by means of squeezing rolls to an extent such that 30 to 50% by weight of the resin, based on the weight of the fabric, is deposited on the fabric, (4) passing the squeezed fabric through a bath of water maintained at a temperature of from 5 to 15° C. to cause the solvent to diffuse and dissolve in the water and to cause the resin which has impregnated into the fabric to coagulate, uniformly deposit on the surfaces of the individual fibers, and impregnate and fill the interstices between the fibers, thus forming a homogeneous unitary composite structure of the fabric and microporous polyurethane resin, (5) washing the composite structure with water, (6) drying the washed composite structure at a temperature of from 140 to 160° C. to set the resin, and (7) polishing the dried composite structure to an extent such that the thickness of the resin heated fabric is decreased by approximately 0.2 mm.

2. The process according to claim 1, wherein the coagulation step is carried out by passing the squeezed fabric through a first water bath maintained at a temperature of from 5 to 15° C. under substantial absence of tension while being subjected to vibration in the vertical direction of the fabric, and then through a second water bath maintained at a temperature of from 5 to 15° C. while the width of the fabric is increased by means of a tenter.

3. The process according to claim 1, wherein the hydrophilic fibers are selected from the group consisting of cotton, viscose rayon, viscose staple and cupra.

4. The process according to claim 3, wherein the viscose rayon is a polynosic filament or staple.

5. The process according to claim 1, wherein the fabric contains less than 50% of artificial fibers selected from the group consisting of polyester, nylon, acrylic and polypropylene fibers.

6. The process according to claim 1, wherein one surface of the warp knitted fabric is implanted with short fibers by electrostatic coating to provide a napped surface.

References Cited
UNITED STATES PATENTS

| | | | |
|---|---|---|---|
| 3,399,102 | 8/1968 | Matsushita et al. | 161—67 |
| 3,387,989 | 6/1968 | West et al. | 117—76 |
| 3,000,757 | 9/1961 | Johnston et al. | 117—63 |
| 3,190,766 | 6/1965 | Yuan | 117—63 |
| 3,208,875 | 9/1965 | Holden | 117—63 |
| 2,070,251 | 2/1937 | Bird | 117—56 |
| 2,495,808 | 1/1950 | Colmant | 117—56 |
| 3,282,721 | 11/1966 | Tetuya Iseki | 117—7 |
| 3,532,529 | 10/1970 | Endo et al. | 117—62.2 |

WILLIAM D. MARTIN, Primary Examiner

M. SOFOCLEOUS, Assistant Examiner

U.S. Cl. X.R.

117—56, 63, 64 R, 47 R, 135.5, 138.8 E, F, N, V.A.; 161—62, 67, 159